United States Patent [19]
Chitayat

[11] Patent Number: 6,104,269
[45] Date of Patent: Aug. 15, 2000

[54] METHOD FOR MANUFACTURING A TWO AXIS MOTOR WITH HIGH DENSITY MAGNETIC PLATEN

[75] Inventor: Anwar Chitayat, Fort Salanga, N.Y.

[73] Assignee: Anorad Corporation, Hauppauge, N.Y.

[21] Appl. No.: 09/066,111

[22] Filed: Apr. 23, 1998

Related U.S. Application Data

[62] Division of application No. 08/688,704, Jun. 24, 1996, Pat. No. 5,777,402.
[60] Provisional application No. 60/014,315, Mar. 28, 1996.

[51] Int. Cl.$^7$ .................................................. H01F 7/20
[52] U.S. Cl. .......................................... 335/284; 361/139
[58] Field of Search ................................. 29/596; 310/12, 310/42; 318/135; 361/139, 142, 143, 147; 335/284; 399/277

[56] References Cited

U.S. PATENT DOCUMENTS

| | | | |
|---|---|---|---|
| 4,920,326 | 4/1990 | Agarwala | 335/284 |
| 5,025,240 | 6/1991 | LaCroix | 335/284 |
| 5,334,892 | 8/1994 | Chitayat | 310/12 |

*Primary Examiner*—Lincoln Donovan
*Attorney, Agent, or Firm*—John J. Horn; Himanshu S. Amin; A. M. Gerasimow

[57] ABSTRACT

An X-Y positioning machine has a forcer, with armature coils, that moves around on a platen, supported by an air bearing. Magnets embedded in the motor platen generate a fixed magnetic field with which the armature coils interact. Perpendicular elongated coils interact with the fields of magnets in columns and rows. When a traditional rectangular pattern of the magnets is provided, a packing density and average peak magnetic flux intercepted by the coils are limited to 50%. The present invention provides magnet configurations that provide greater than 50% maximum peak flux density and up to 100% packing density. Several magnet arrangements are provided: a first in which round magnets are used instead of square, and a second in which diamond-shaped magnets are used. The latter can be used at 100% packing density arrangement. In addition to high peak flux density for a narrow coil, these embodiments exhibit low cogging forces. A method of making the magnet is also provided. To create the equivalent of a closely-packed array of circular magnets, a single sheet of magnetizable material is pressed against an high permeability element such as one of iron, and a pair of adjacent coils pressed against the magnetizable material with currents running in opposite directions. This forms a pair of round adjacent magnetic regions. The coils are moved systematically over the sheet of magnetizable material and the magnetization repeated. This process repeats until the sheet has a close-packed array of magnetic regions.

10 Claims, 9 Drawing Sheets

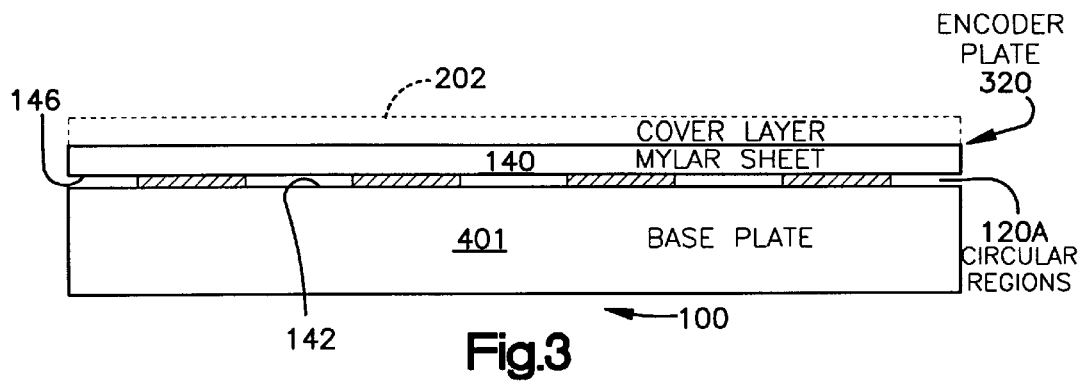
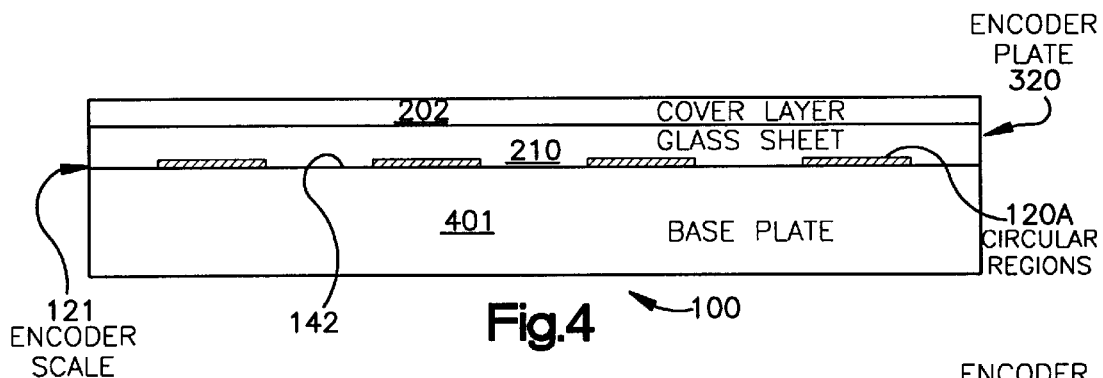
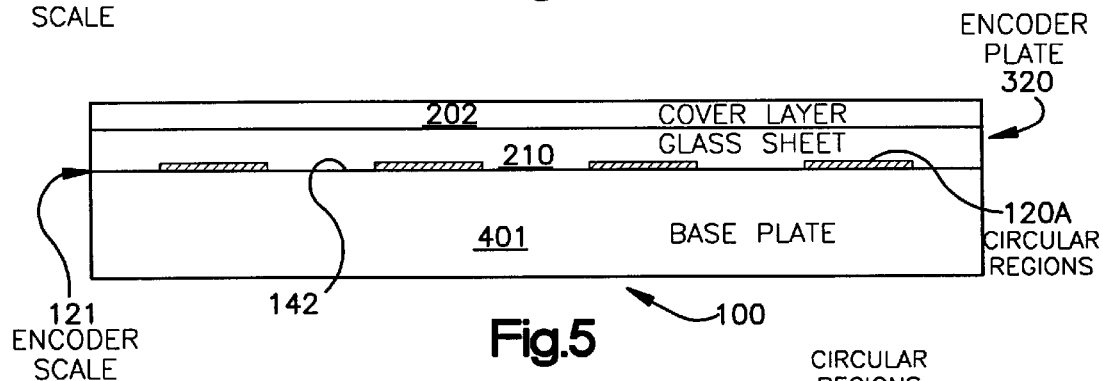
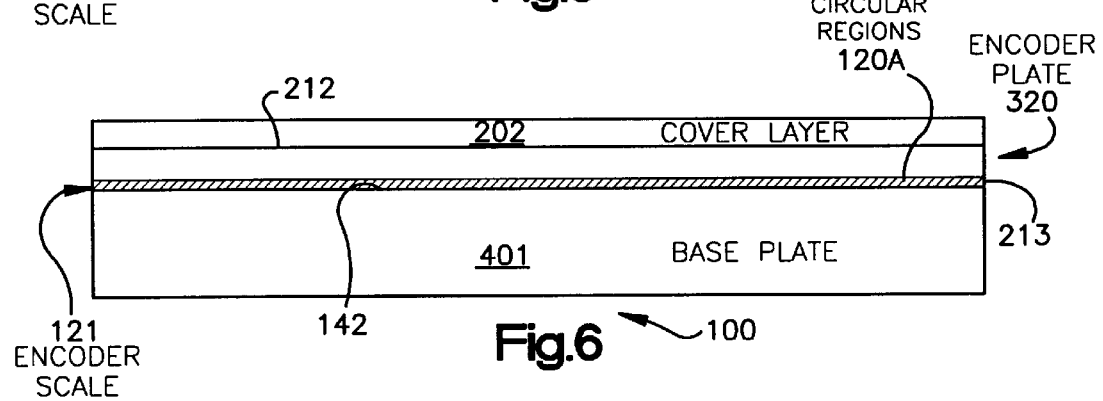

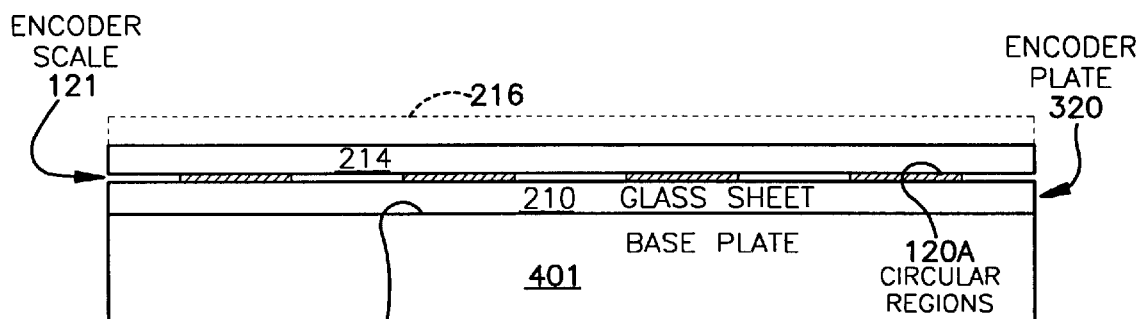
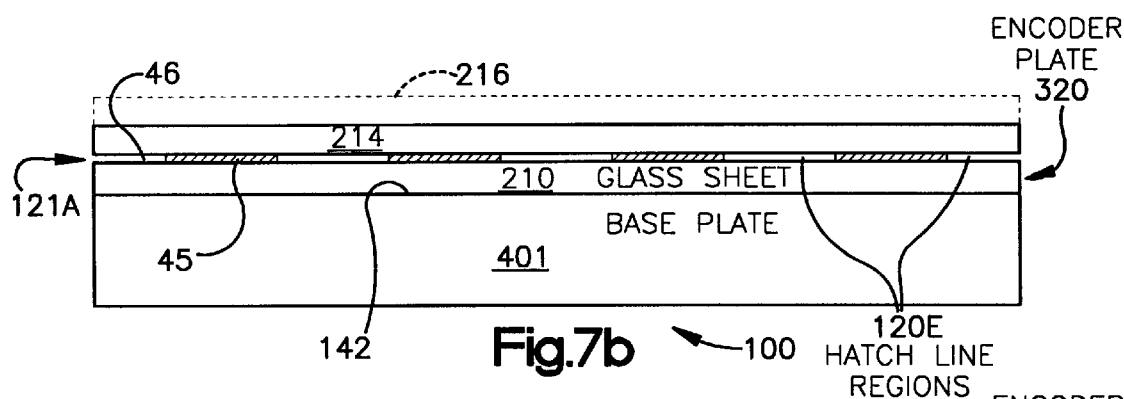
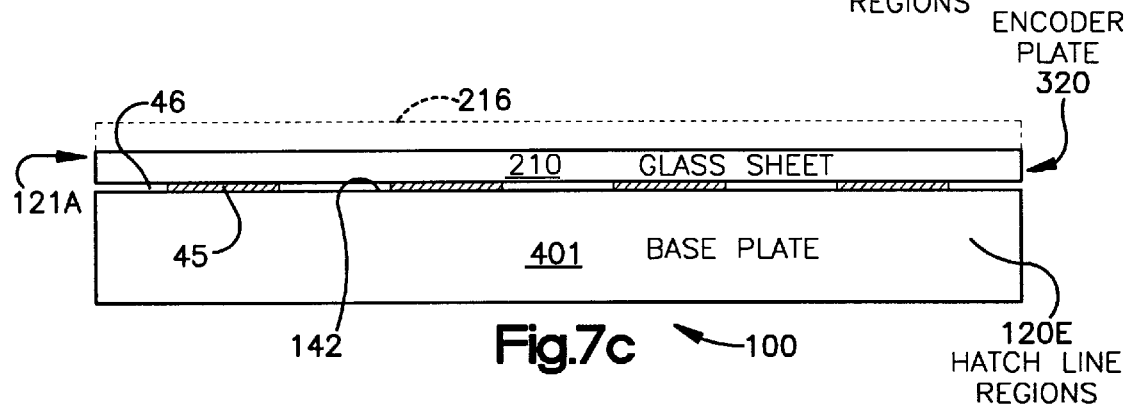
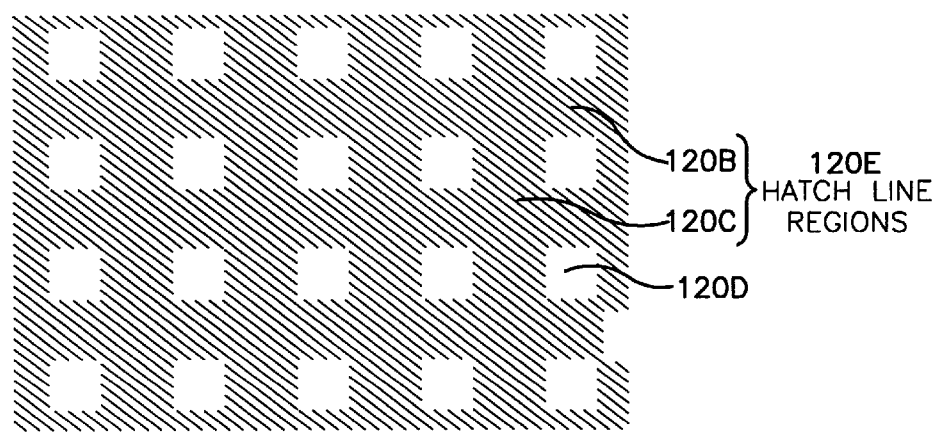
Fig.7d

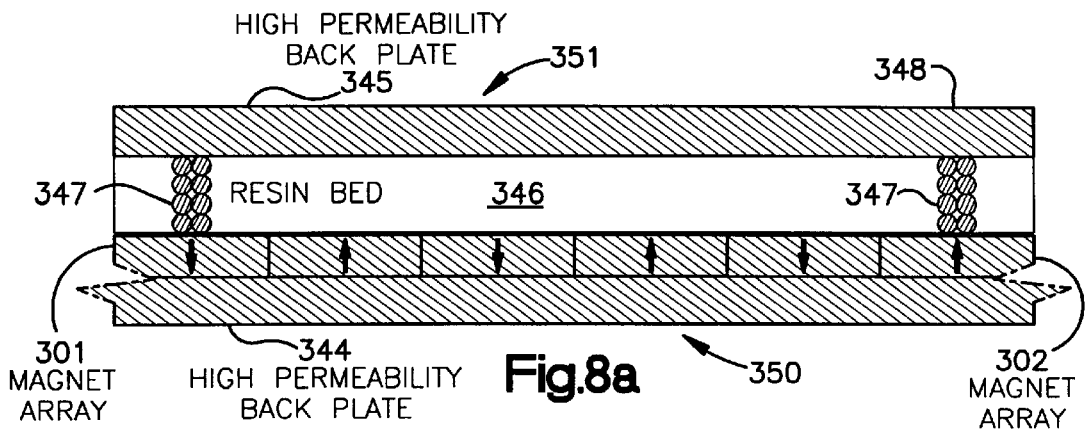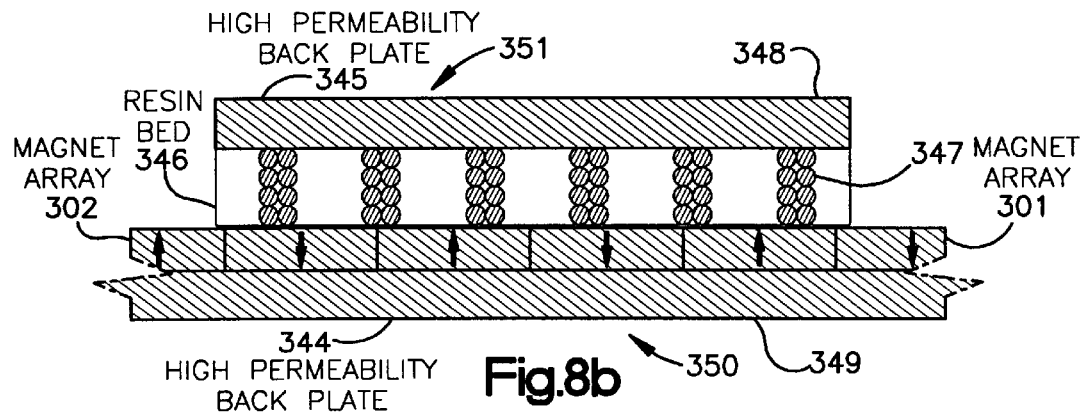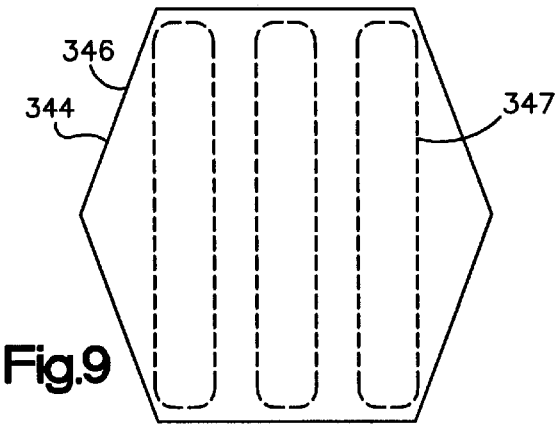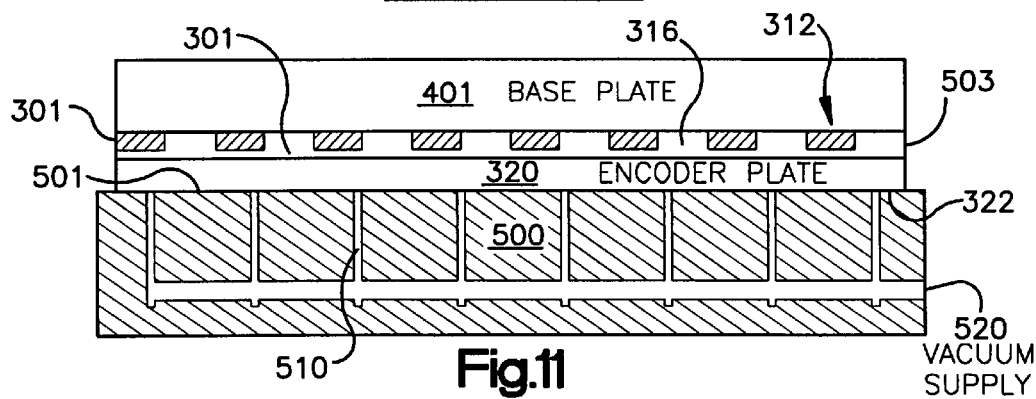

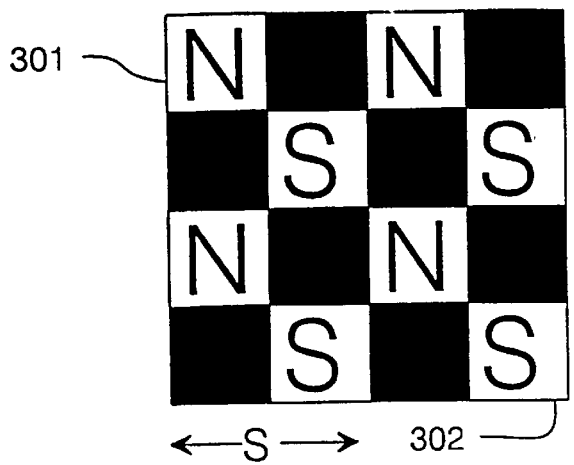
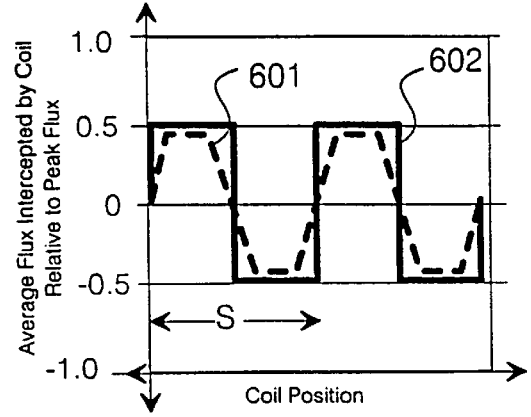
Fig. 13a
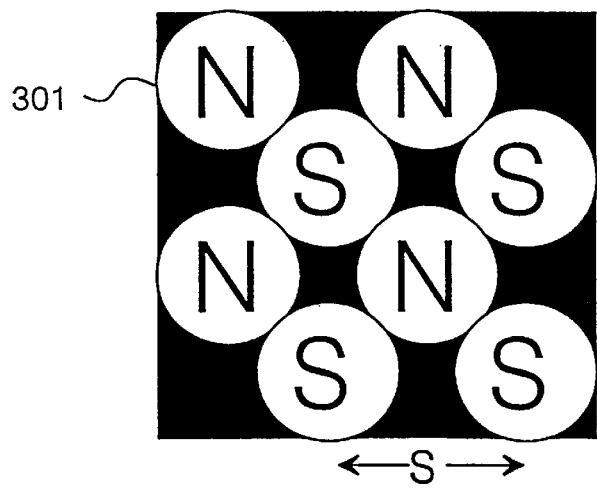
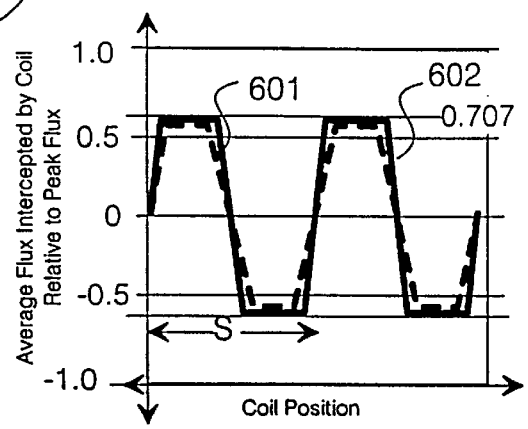
Fig. 13b
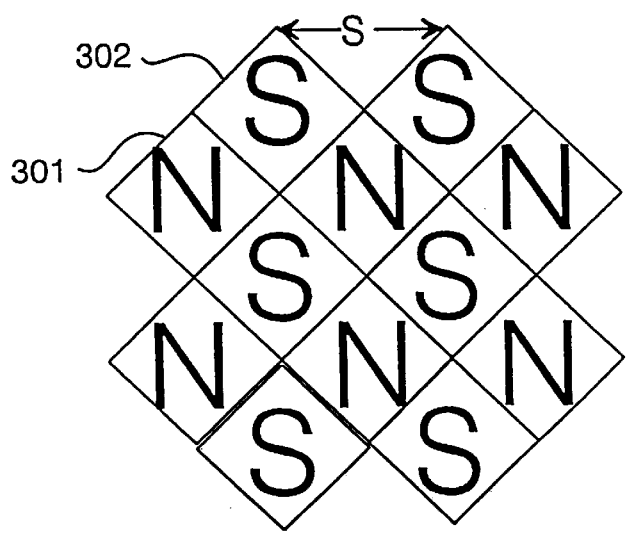
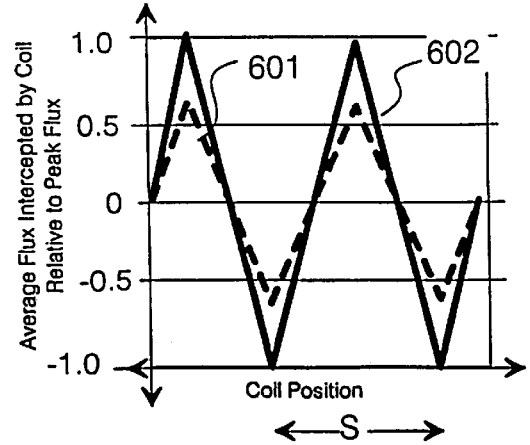
Fig. 13c

METHOD FOR MANUFACTURING A TWO AXIS MOTOR WITH HIGH DENSITY MAGNETIC PLATEN

This is a divisional application of application Ser. No. 08/668,704 filed on Jun. 24, 1996 U.S. Pat. No. 5,777,402 for which a Notice of Allowance has issued. This was a continuation of Provisional application Ser. No. 60/014,315 filed Mar. 28, 1996.

BACKGROUND OF THE INVENTION

The present invention relates to devices known variously as traversing machines, positioning devices, actuators, etc. More particularly, the invention relates to such devices with the ability to traverse along more than a single axis.

A two-axis motor with a stage (also known as a forcer) supported by an air bearing on a motor platen surface is described in U.S. Pat. No. 5,334,892, the entirety of which is incorporated herein by reference. In this motor, the motor platen has a rectangular array of permanent magnets embedded in it. Mutually perpendicular sets of X and Y coils in the stage interact with the magnetic fields of the magnets to move and position the stage.

In the prior art motor described above, the packing density of the magnets in the motor platen is about 50%. It is desirable to increase the magnetic flux density to increase the peak motive force on the stage and also to allow a larger air gap between the stage coils and the platen magnets. Cogging is also an ever-present problem in such motors.

OBJECTS AND SUMMARY OF THE INVENTION

An object of the present invention is to provide a motor platen for an X-Y motor.

Another object of the present invention is to provide a motor platen for an X-Y motor that provides for high peak motive force.

Yet another object of the present invention is to provide a motor platen with high magnetic flux density to allow large air gaps between the coils and magnets.

Yet another object of the present invention is to provide a motor platen for an X-Y motor that is simple to manufacture.

Yet another object of the present invention is to provide a motor platen for an X-Y motor that is characterized by low cogging effects.

Briefly, an X-Y positioning machine has a forcer, with armature coils, that moves around on a platen, supported by an air bearing. Magnets embedded in the motor platen generate a fixed magnetic field with which the armature coils interact. Perpendicular elongated coils interact with the fields of magnets in columns and rows. When a traditional rectangular pattern of the magnets is provided, a packing density and averaged peak magnetic flux intercepted by the coils are limited to 50%. The present invention provides magnet configurations that provide greater than 50% averaged peak flux density and up to 100% packing density. Several magnet arrangements are provided: a first in which round magnets are used instead of square, and a second in which diamond-shaped magnets are used. The latter can be used at 100% packing density arrangement. In addition to high peak flux density for a narrow coil, these embodiments exhibit low cogging forces. A method of making the magnet is also provided. To create the equivalent of a closely-packed array of circular magnets, one or more sheets of magnetizable material is squeezed between a high permeability element such as piece of iron, and a pair of adjacent coils pressed against the magnetizable material with currents running in opposite directions. This forms a pair of round adjacent magnetic regions. The coils are moved systematically over the sheet of magnetizable material and the magnetization repeated. This process repeats until the sheet has a close-packed array of magnetic regions. Modular pieces of magnetizable material, each with a set of magnetized regions that form an integral number of cycles of the required pattern of magnetic regions, can then be tiled to form a translationally symmetric pattern. This method facilitates manufacturing by reducing the number of pieces that must be handled.

According to an embodiment of the present invention, there is provided, an X-Y positioning system, comprising: a generally planar motor platen with a plurality of magnets, forming a planar array, attached thereto, a stage movably connected to the motor platen, the stage having a first longitudinal coil arranged with a long axis thereof oriented in a first direction, the stage having a second longitudinal coil arranged with a long axis thereof oriented in a second direction substantially perpendicular to the first direction, the plurality of magnets including first magnets oriented with their north poles facing in a third direction perpendicular to a plane of the array and second magnets with their north poles facing in a fourth direction opposite the third direction, the coils being arranged such that it is possible to draw a line segment in a plane of the planar array where the line segment touches several of the first magnets without touching any of the second magnets, with less than 50% of the line segment running over an area not occupied by a magnet.

According to another embodiment of the present invention, there is provided, a positioning system, comprising: a motor platen with a planar array of substantially round magnets, the planar array having first magnets with their north poles facing in a first direction perpendicular to a plane of the planar array, the planar array having second magnets with their north poles facing in a second direction, opposite the first direction, the first magnets forming a first regular array of parallel columns and a first regular array of parallel rows, the second magnets forming a second regular array of parallel columns and a second regular array of parallel rows, the first regular array of parallel columns being parallel to the second regular array of parallel columns and the first regular array of parallel rows being parallel to the second regular array of parallel rows, the planar array being characterized by a packing density of more than 50%, a stage movably connected to the motor platen, the stage having a first longitudinal coil with a long axis parallel to the first axis and the stage having a second longitudinal coil with a long axis parallel to the second axis.

According to still another embodiment of the present invention, there is provided, a positioning system, comprising: a motor platen with a planar array of substantially parallelogram-shaped magnets, the planar array having first magnets with their north poles facing in a first direction perpendicular to a plane of the planar array, the planar array having second magnets with their north poles facing in a second direction, opposite the first direction, the first magnets forming a first regular array of parallel columns and a first regular array of parallel rows, the second magnets forming a second regular array of parallel columns and a second regular array of parallel rows, the first regular array of parallel columns being parallel to the second regular array of parallel columns and the first regular array of parallel rows being parallel to the second regular array of parallel rows, the planar array being characterized by a packing density of approximately 100%, a stage movably connected to the motor platen, the stage having a first longitudinal coil with a long axis parallel to the first axis and the stage having a second longitudinal coil with a long axis parallel to the second axis.

According to still another embodiment of the present invention, there is provided, a motor, comprising: a base having a surface, a stage having an X-motor and a Y-motor and a bearing to support the stage at a substantially constant distance from the planar surface, the base having an array of north-pole magnets and south-pole magnets, each having a north pole, the X-motor and the Y-motor being effective to interact with fields generated by the north-pole and south-pole magnets to produce a motive force to move the stage relative to the base, the north-pole magnets being oriented with the north poles thereof directed oppositely the north poles of the south-pole magnets, the north-pole and south-pole magnets being arranged in an array conforming to the surface such that mutually parallel curves (the term "curve" being used in its general mathematical sense to encompass straight lines as well is non-straight lines), parallel to the surface, can be placed at regular intervals, each curve substantially intercepting only one of the north-pole and the south-pole magnets without intercepting the other of the north-pole and south-pole magnets, each of the north-pole and south-pole magnets being shaped such that the mutually parallel curves can also be placed such that first portions of each of the mutually parallel curves intercepting the only one of the north-pole and south-pole magnets is greater than second portions not intercepting the only one of the north-pole and south-pole magnets and the mutually parallel curves having a constant slope in a coordinate system defined by a range of movement of the motor.

According to still another embodiment of the present invention, there is provided, a method of making an array of magnets, comprising the steps of: placing a generally planar piece of magnetizable material on a piece of material with a magnetic permeability comparable to or greater than that of iron, placing, against a face of the piece of magnetizable material opposite the piece of high magnetic permeability material, a pair of coils, generating currents in the coils, a direction of current in one of the coils being opposite that of a direction of current in the other and holding the coils against the piece of magnetizable material for a sufficient period of time to form a magnetized region.

According to still another embodiment of the present invention, there is provided, a method of making an array of magnets, comprising the steps of: placing, against opposite faces of a generally planar piece of magnetizable material, a pair of coils, generating currents in the coils, a direction of current in one of the coils being the same as that of a direction of current in the other and holding the coils against the piece of magnetizable material for a sufficient period of time to form a magnetized region.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a side view of a base of the X-Y positioning system of FIG. 2 according to an embodiment of the invention.

FIG. 4 is a side view of the base of the X-Y positioning system of FIG. 2 according to another embodiment of the invention.

FIG. 5 is a side view of the base of the X-Y positioning system of FIG. 2 according to still another embodiment of the invention.

FIG. 6 is a side view of the base of the X-Y positioning system of FIG. 2 according to still another embodiment of the invention.

FIGS. 7a–7d are side views of the base of the X-Y positioning system of FIG. 2 according to still other embodiments of the invention.

FIG. 8a is section view of an armature a coil, without a high permeability core, and a magnetic platen, the section being taken along a longitudinal axis of one of the coils.

FIG. 8b is section view of an armature a coil, without a high permeability core, and the magnetic platen, the section being taken across the longitudinal axes of the coils.

FIG. 9 is a top view of a coreless, low-cogging, armature for an X-Y motor according to an embodiment of the invention.

FIG. 11 is a section view of an assembly for making the base with the encoder plate.

FIGS. 13a, 13b, and 13c are plan views of permanent magnet shapes/arrangements to produce the stationary field with which the motor in the stage interacts to provide motive force to move the stage with respect to the base.

DETAILED DESCRIPTION OF THE PREFERRED EMBODIMENT

Figure 1:
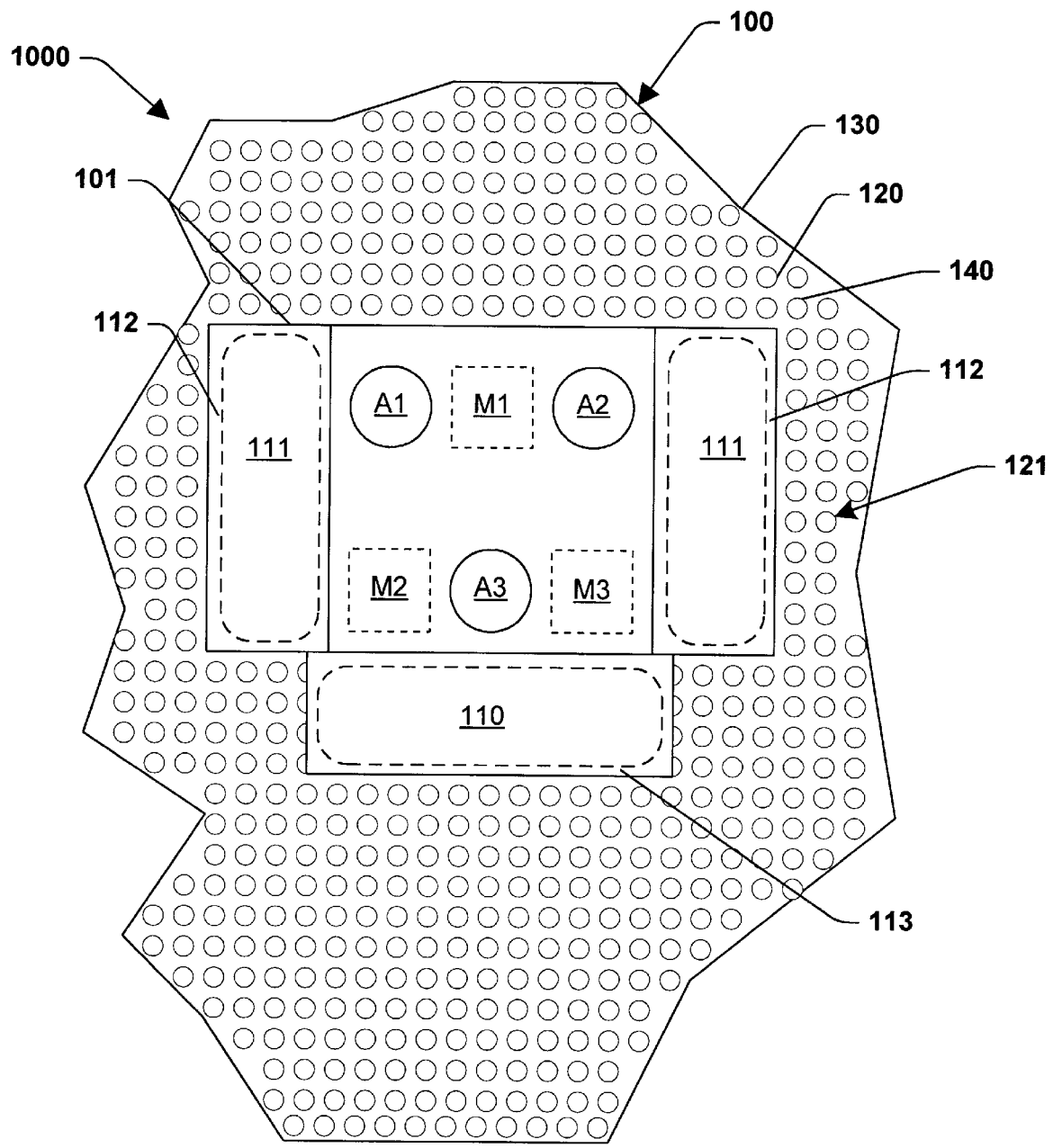
FIG. 1 is a schematic plan view of an X-Y positioning system with a position and orientation-detecting apparatus according to an embodiment of the present invention.

Referring to FIG. 1, an X-Y traversing system 1000 has a base 100, with a stage 101 supported on base 100 by several air bearings A1–A3. Stage 101 has a built-in motor that orients and moves stage 101 with respect to base 100 as described in U.S. Pat. No. 5,334,892, the entirety of which is incorporated herein by reference. Base 100 has an array of permanent magnets (not shown) with which motors M1, M2, and M3 in stage 101 interact to cause stage 101 to move about base 100 with a constant orientation of stage 101.

Figure 2A:
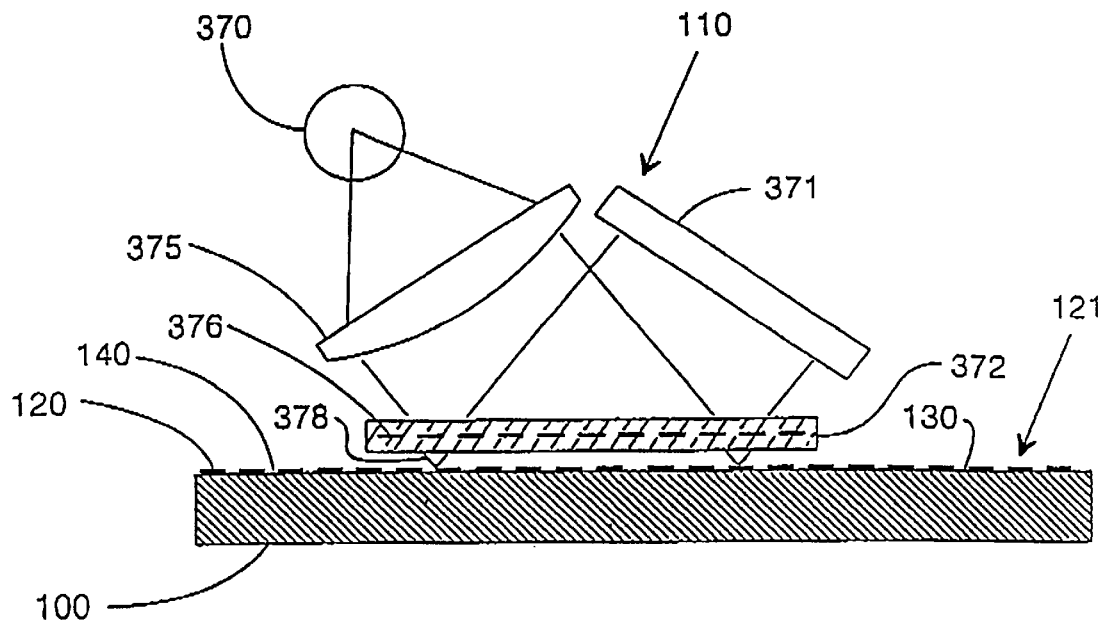
FIG. 2a is a side view of an optical pickup taken along a longitudinal axis.
Figure 2B:
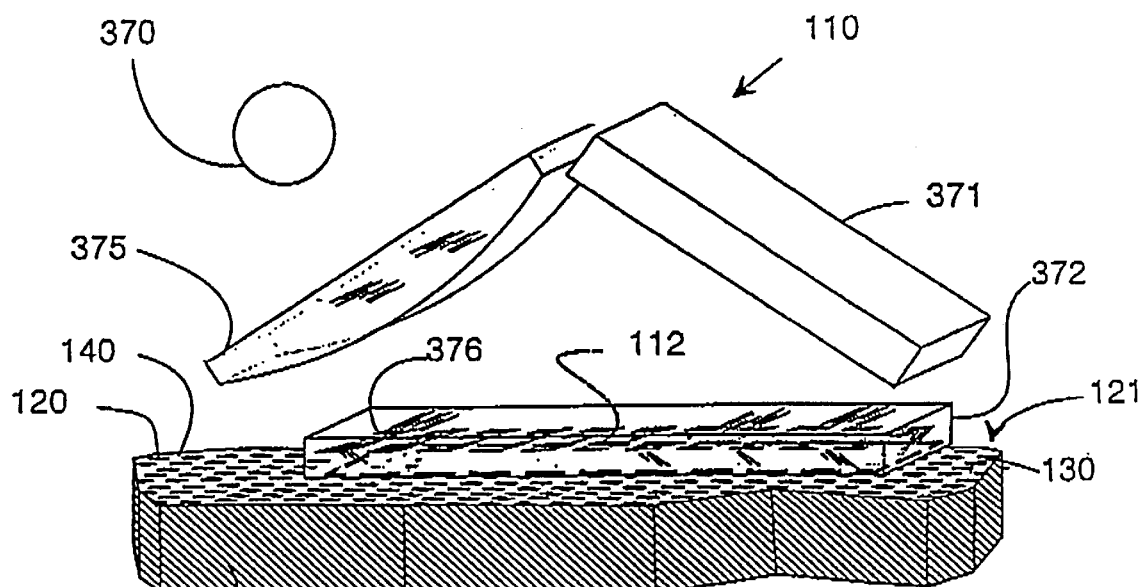
FIG. 2b is a section view of the optical pickup of FIG. 2a taken across the longitudinal axis.

Referring now also to FIGS. 2a and 2b, in order to employ X-Y traversing system 1000 for precise positioning, it is necessary to detect two independent coordinates representing the position of stage 101 relative to base 100. An encoder system is employed to detect movement of stage 101 relative to base 100. The encoder system includes a grid encoder scale 121 with circular regions 120 of a surface 130 of base 100 whose reflectivity is much higher than intersticial area 140 separating circular regions 120. (alternatively, circular regions 120 can have a low reflectivity and intersticial area 140, a high reflectivity.) Circular regions 120 are of a highly reflective coating formed on surface 130 of base 100. An X-direction optical pickup 110 and a Y-direction optical pickup 111 (not shown in FIGS. 2a and 2b, but identical to X-direction optical pickup 110 as shown in FIGS. 2a and 2b) detect movement of stage 101 relative to base 100.

Note that the proportions of elements of X-Y traversing system 1000 shown in FIG. 1 are deliberately distorted for illustration purposes. For example, in a practical system, the relative sizes of air bearings A1, A2, and A3 would be chosen for proper balance and might not be the same as illustrated. Optical pickups 110 and 111 would probably be substantially smaller as would circular regions 120 (in fact the latter might not be visible with the naked eye). Also, the sizes of motors M1–M3 would be chosen according to known design principles and each would not likely be the same size as shown. In addition, details of optical pickups 110 and 111 are not necessarily as shown in FIGS. 2a and 2b which was created for the purpose of providing a general explanation of how the encoder system works.

Each optical pickup 110, 111 projects light on its respective discrimination region 112, 113 and detects the light reflected therefrom. Light from a light source 370 is collimated by a condenser lens 375 and directed to a reticle 372. Reticle 372 has a series of mask regions 376 (usually a metalized coating over a substrate, where the metalized coating has been etched to define mask regions 376) comprising an index grating. The spacing of mask regions 376 is substantially equal to a spacing or pitch of circular regions 120. Reflected light passes through reticle 372 to encoder scale 121. Mask regions 376 create shadows in the light beam transmitted through reticle 372. When transmitted light beams 378 coincide with circular regions 120, they are substantially reflected since circular regions 120 are more reflective than intersticial area 140. When encoder 110 moves in the X-direction a distance equal to half the dot-pitch, the transmitted light beams 378 hit substantially only the intersticial area, reducing the amount of light reflected. Reflected light passes back through reticle 372 and is detected by a photo-sensor 371. As X-direction optical pickup moves the reflected light cycles between maxima and minima generating an electrical signal that is processed to determine cumulative movement. As can be seen by inspection, X-direction optical pickup is responsive essentially, only to movement in the X-direction since the light reflected by short columns of circular regions 120 spanning the width of reticle 372 is averaged. As can also be seen by inspection, Y-direction optical pickup 111, using the same construction as X-direction optical pickup 110, but aligned with the Y-direction instead of the X-direction, is responsive only to movement in the Y-direction. Instead of dots, grid scale 121 can be composed of a grid of overlapping lines defining squares (which correspond to circular regions 120) between them. In addition, it is not necessary that circular regions (or the squares, if overlapping lines are formed) have a higher reflectivity than intersticial region 140. The opposite may be true and the system works just as well.

In summary, optical pickups 110, 111 each employ a reticle with a grating whose spacing corresponds to the spacing of columns of and rows of circular regions of grid scale 121. Light produced by optical pickups 110, 111 passes through a respective reticle and reflects from circular regions 120. Because the spacing of the grating corresponds to the spacing between columns and rows of circular regions 120, the total amount of reflected light cycles as optical pickups 110, 111 move over grid scale 121. Photo sensors 371 produce a signal corresponding to the net reflected light which cycles for each increment of movement equal to the circular region spacing.

In a practical system, to sense direction of movement, optical pickups 110 and 111 could have multiple photo sensors 371 and the spacing of mask regions 376 would not be the same as the period of reflective regions 120. A moving pattern (like a moire pattern) would be projected on the multiple photo sensors and the direction of movement thus determined. Note that the proportions of elements of optical pickups 110 and 111 have been distorted for explanation purposes. In a real device, the density of reflective regions 120 and the mask regions 376 in the reticle would probably be much higher. In addition, the spacing, thickness, and lens power of the elements is not intended to be accurately represented by FIGS. 2a and 2b.

Circular regions 120 are arranged in a regular pattern with constant spacing between adjacent columns and rows of circular regions 120. Note, however, that if the resolution required for one axis is lower than that required for the other axis, the spacing between rows need not be the same as the spacing between columns.

According to a preferred embodiment of the invention, the distance between the motor coils and permanent magnets is increased from the usual spacing of a few thousands of an inch (required in stepper motors that employ serrations using the so-called "Sawyer principle") to spacings on the order of 0.05 inch. Motor coils (also known as "armatures") can have high-permeability cores or no cores at all, the coils being embedded only in epoxy or some other non-magnetic insulator. Where high permeability material is used for a core, the material is usually laminated to minimize eddy current generation. The configuration of these motors, the armatures and the magnetic platen with which they cooperate, are described further below with reference to FIGS. 8a, 8b, and 9. For now, please note that this configuration, and others, permit the spacing between the coils and motor platen to be large enough to accommodate a layer of material with encoder scale 121 formed thereon. This layer can be a separate element (for example, as discussed with reference to FIG. 3, a mylar sheet 140 imprinted with circular regions 120), which offers several advantages that are discussed below.

Referring to FIG. 3, circular regions 120A (exaggerated in size and proportion for clarity) are imprinted on a mylar sheet 140 adjacent to a surface 142 of a base plate 401 of base 100 to form an encoder plate 320. In this embodiment, the imprinted surface 146 of mylar sheet 140 faces surface 142 of base plate 401. Mylar sheet 140 is clear to allow optical pickups 110, 111 to detect circular regions 120A. An optional cover layer 202 or sheet of clear film (such as mylar) may be employed to protect mylar sheet 140, which has circular regions 120A imprinted on it. By using printing or etching technology to imprint on mylar sheeting rather than machining or imprinting on the surface of base 100 (a three-dimensional object) directly, great cost effectiveness may be achieved. In addition, should mylar sheet 140 become damaged (for example, due to failure of the air bearings supporting stage 101) mylar sheet 140 or cover layer 202 can be readily replaced.

Circular regions 120A may be imprinted on mylar sheet 140 using known dot-printing technology ordinarily employed for printing. Such technology is well known for printing on surfaces of various materials and is capable of high accuracy and high resolution. In addition to the laser or LED (light emitting diode) technology used to produce a latent image that is developed with toner, mylar sheet can also be metallized and chemically etched. For example, mylar sheet 140 can be coated with a metal layer on which is deposited a photo-resist material which is chemically altered by light. After a latent light image is impressed on the photo-resist, the differing properties of the exposed and non-exposed photo-resist permit only a portion of the photo-resist to be removed and the metal chemically etched only where photo-resist has been removed using known chemical etching techniques.

Referring to FIG. 4, in another embodiment of encoder plate 320, circular regions 120A, constituting grid encoder scale 121, are formed (by machining, chemical etching, printing, or some other means) directly on surface 142 of base plate 401. Protective transparent sheet 210 is laid over surface 142 to protect grid encoder scale 121. Optionally a cover layer 202 can be laid over protective transparent sheet 210 to protect it. If the air bearings ever failed, protective transparent protective sheet 210 and/or cover layer 202 protects surface 142 and grid encoder scale 121. Cover layer 202, made of glass, plastic, mylar, and protective transparent sheet 210, can then be replaced. In a preferred embodiment of the present invention, the protective transparent sheet 210 is a glass sheet, and will be referred to as such in the remainder of the description.

Referring to FIG. 5, in still another embodiment of base 100 and encoder plate 320, circular regions 120A, constituting grid encoder scale 121, are formed (by chemical etching, machining, printing, or some other means) on the lower surface of glass sheet 210. Cover layer 202 of mylar or glass should be used to protect glass sheet 210 with grid encoder scale 121 to preserve its clarity.

Referring to FIG. 6, in still another embodiment of encoder plate 320, circular regions 120A, constituting grid encoder scale 121, are formed on the lower surface of mylar sheet 212. Mylar sheet 212 has a metalized coating 213 that has been etched to form circular regions 120A. Cover layer 202 of mylar or glass should be used to cover mylar sheet 212 with grid encoder scale 121. However, since mylar sheet 212 can be produced in continuous quantities (metal-coated with grid encoder scale 121 etched thereon), cover layer 202 may not be necessary because of the relatively low cost of replacing 212, which may be laid over surface 142 of base plate 401 and adhered by static charge, vacuum, gravity, or clamping at its edges. Note that irregularities in the orientation of mylar sheet 212 do not present a problem since the data processing used for position/movement detection can compensate for such irregularities according to known data filtering techniques.

Referring to FIG. 7a, in still another embodiment of encoder plate 320 circular regions 120A, constituting grid encoder scale 121, are formed (by chemical etching, machining, printing, or some other means) on the upper surface of glass sheet 210. A protective sheet of mylar or glass 214 is used to cover glass sheet 210 with grid encoder scale 121. Optionally, cover glass or mylar sheet 214 can be overlaid with another cover glass or mylar sheet 216 to protect cover glass or mylar sheet 214. Cover glass or mylar sheet 216 preserves the transparency of cover glass or mylar sheet 214.

Referring to FIGS. 7b and 7d, in still another embodiment of encoder plate 320 hatch line regions 120E, constituting grid encoder scale 121A, are formed (by chemical etching, machining, printing, or some other means) on the upper surface of glass sheet 210. Hatch line regions 120E, including horizontal line regions 120B and vertical line regions 120C, define a plurality of square regions 120D between them. Square regions 120D function similarly to circular regions 120A. A protective sheet of mylar or glass 214 is used to cover glass sheet 210 with grid encoder scale 121A. Optionally, cover glass or mylar sheet 214 can be overlaid with another cover glass or mylar sheet 216 to protect cover glass or mylar sheet 214. Cover glass or mylar sheet 216 preserves the transparency of cover glass or mylar sheet 214.

Referring to FIGS. 7c and 7d, in still another embodiment of encoder plate 320 hatch line regions 120E, constituting grid encoder scale 121A, are formed (by chemical etching, machining, printing, or some other means) on the upper surface of base plate 401. Hatch line regions 120A, including horizontal line regions 120B and vertical line regions 120C, define a plurality of square regions 120D between them. A protective sheet of mylar or glass 214 is used to cover glass sheet 210 with grid encoder scale 121A. Glass sheet 210 covers grid encoder scale 121A. Optionally, glass sheet 210 can be overlaid with another cover glass or mylar sheet 216 to protect cover glass or mylar sheet 214. Cover glass or mylar sheet 216 preserves the transparency of cover glass or mylar sheet 210. Note that glass sheet 210 could be replaced by a mylar sheet or some other transparent sheet material. Also, in the FIG. 7c embodiment, grid encoder scale 121 could be formed on glass (or mylar) sheet 210 instead of base plate 401. Another alternative is to form horizontal line regions 120B on one layer (for example glass sheet 210) and vertical line regions 120C on another layer (for example base plate 401). This can make for easier manufacturing of hatch line regions 120E.

Encoder plate 320, configured according to any of various embodiments described above, is laid adjacent base 100. A differential signal derived from the two Y-axis optical pick-ups 111 is used to maintain orientation of stage 101 with respect to base 100.

Referring to FIGS. 8a, 8b, and 9 a thin coreless type of armature employs motor coils 347 embedded in an epoxy resin bed 346. No high-permeability material is used inside motor coils 347. Epoxy resin bed 346 is attached to a high permeability back plate 345. A motor platen 350 has an array of magnets 301 and 302 and backed by another high permeability plate 344. High permeability plates 345 and 344 are preferably of steel for cost-effectiveness and strength, but can be made with other materials. High permeability plates 345 and 344 should have a high permeability such as materials typically employed in armatures with cores. The presence of high permeability plates 345 and 344 helps to close the magnetic circuits shown by lines 348. Without magnetic (high permeability) materials immediately adjacent permanent magnets 301 and 302, as in iron core armatures, cogging is drastically reduced. Further reduction in cogging can be achieved by shaping edges of armature back plate 345 as shown in FIG. 9. The detailed dimensions of hexagon-shaped back plate 345 are not given as they can be numerically and experimentally optimized according to known techniques, the optimum dimensions varying at least with magnet size and spacing.

The forgiving spacing between magnetic platen 350 and armature 351 allowed by employing motor coils encased in epoxy-only, rather than using high permeability materials, such as steel, is enhanced by using relatively thick magnets, on the order of 0.3–0.6 inch. Neodymium-iron magnets are preferred with this type of motor configuration. The greater spacing between the magnets and armature windings (motor coils) allows layers of material, at least one with encoder scale 121 (121A) etched or printed thereon can be laid over base 100.

Another alternative for the armature construction is to use pressed powder materials. Pressed metal powder elements are made of finely divided metal mixed with an insulative binder. The material is heated and compressed to form a high-density, high strength material that can be formed readily into an armature for an X-Y motor. The resulting armature's ability to reduce eddy currents, unlike that for laminations, is isotropic. That is, since in such material, eddy currents are confined to the small regions defined by the metal particles encapsulated in binder material and the dimensions of such particles are statistically the same regardless of orientation, it does not matter what the orientation of the permanent magnet fields relative to the armature and its direction of movement. Eddy currents generated by movement in nearly all axial directions are suppressed equally. This has important ramifications for an X-Y motor, such as in the present invention. While it is possible to arrange the laminations in a rotary or single-axis motor such that eddy currents will be strongly suppressed during movement, in a two-axis motor, laminations cannot be oriented to strongly suppress eddy currents in both X- and Y-oriented armatures for both directions of movement. However, the pressed metal powder material suppresses eddy currents irrespective of the direction of movement. Such materials are commercially available.

Figure 10A:
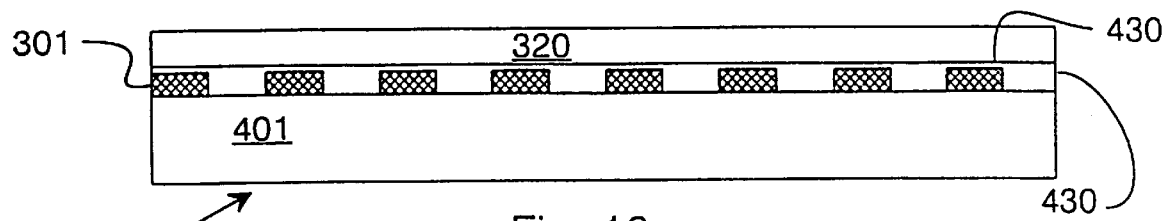
FIGS. 10a and 10b are section and plan views of the base showing the permanent magnets.
Figure 10B:
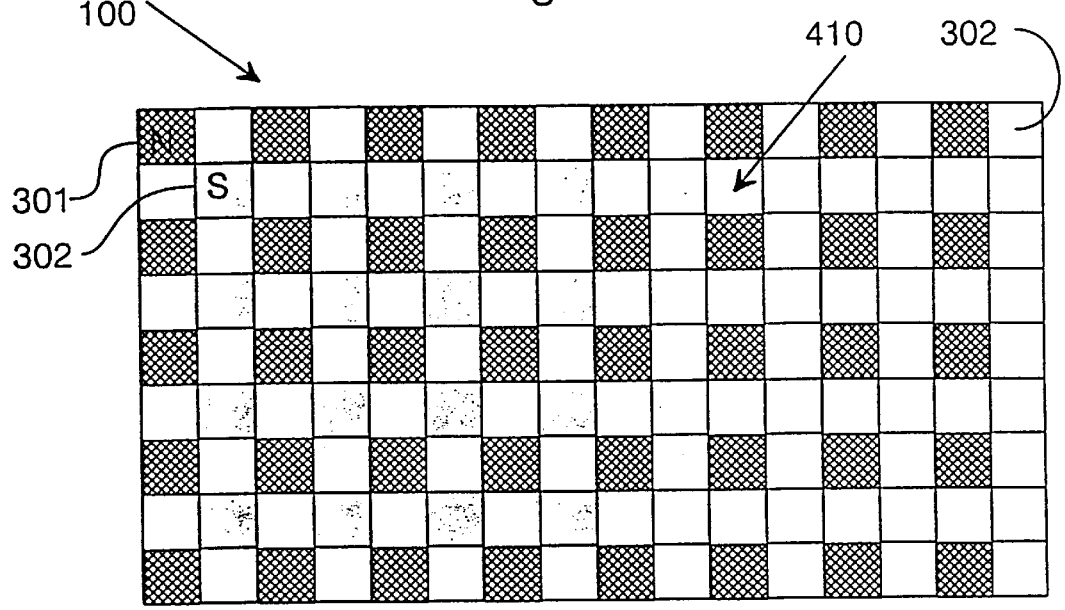

Referring now also to FIGS. 10a and 10b, to form base 100, a base plate 401, which must be flat, but not necessarily as flat as required for the air bearing surface, is covered with a rectangular array of permanent magnets 410. The spaces between, and overlying, permanent magnets 410 are filled with epoxy 430 to completely cover permanent magnets 410 and base plate 401. To form a smooth flat surface, a surface 440 of epoxy 430, once epoxy 430 has been cured, is precision ground so that when encoder plate 320 is laid on top, a flat surface is presented. Of course, this assumes that surface irregularities will not be generated by variations in the thickness of the materials making up encoder plate 320.

Referring to FIG. 11, an alternative way of making base 100 compensates for such thickness variations in, for example, plate glass, used in the encoder plate embodiments described above. First, an optical flat 500 is provided which has as flat a surface as desired for the air bearing surface. Optical flat 500 is supplied with holes 510 which are connected to a vacuum supply 520 so that a vacuum can be pulled between a surface 501 of optical flat 500 and any object laid on top of it. Next, encoder plate 320, with the grid encoder scale facing surface 501, is laid on top of optical flat 500. A vacuum is then pulled. Preferably, the vacuum should be strong enough to cause the encoder plate 320 to flatten against the surface of optical flat 500 so that the surface of encoder plate 320 presenting the grid encoder scale is pulled completely flat (that is, there are no spaces between surface 501 of optical flat 500 and encoder plate 320). Once encoder plate is drawn flat, permanent magnets 301 (permanent magnets 302 are present also but not shown in the section of FIG. 11) are arranged on a back surface 322 of encoder plate 320 to form array of permanent magnets 312. Standoffs (not shown) can be used to separate permanent magnets 301, 302 from the immediately-adjacent layer be it glass or whatever to allow epoxy to flow into the space between that layer and the magnets. The entire surface is then covered with epoxy 316 to fill the spaces between permanent magnets 301 and to cover the tops of permanent magnets 301. Before epoxy 316 is hardened, base plate 401 is laid on top of epoxy 316. After epoxy 316 hardens, the vacuum is removed and base 100 is completed.

One advantage of using mylar as the outer protective sheet is that if a flat encoder plate is formed using the above method, the thickness irregularities introduced in the outermost cover sheet layer will not be as great as if plate glass is used as a protective cover.

Figures 12A, 12B, 12C:
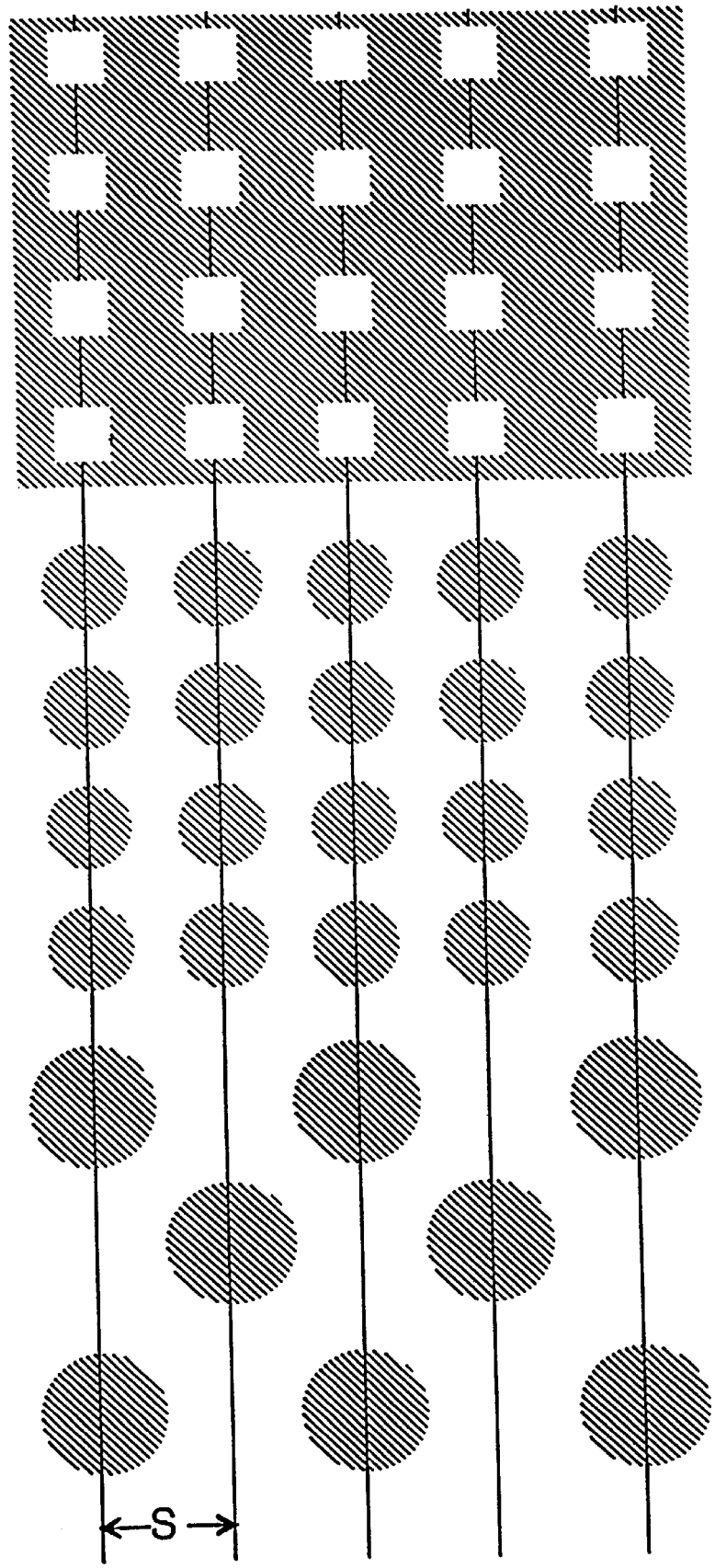
FIGS. 12a, 12b, and 12c are plan views comparing three different arrangements of reflective and non-reflective regions to form grid encoder scales according to respective embodiments of the invention.

Referring now to FIGS. 12a, 12b, and 12c, there are various ways to form the regions with different reflective properties that form grid encoder scale 121. To obtain a scale for which the distance per cycle (cycle-pitch) of the signal from each optical pickup 110, 111 is S (signal's cycle-pitch= S), vertical and horizontal lines can be etched or printed on surface 130, glass sheet 210, etc. to form squares S/2 by S/2 in size. An improvement to rectangular pattern of squares can be obtained by forming dots instead of squares, which permits the maximum dimension of the regions to be increased from S/2 by S/2 squares to 0.707S diameter circles (FIG. 12b). The diameter of the circles can be increased even more if they are laid out in a 45-degree diagonal array (FIG. 12c), in which case, the circles can have a diameter of S for the same signal cycle-pitch. Because of the larger region size relative to the signal's cycle-pitch, the embodiments of FIGS. 12b and 12c permit a finer-resolution scale to be manufactured with technology capable of discriminating regions with a given resolution. That is, if a given printing technology is capable of printing regions with a minimum size of S, then the resolution of the resulting scale using a 45° array of circular regions will be twice that of a rectangular pattern of vertical and horizontal lines.

Referring to FIGS. 13a, 13b, and 13c, permanent magnets 301 and 302 are traditionally arranged in a rectangular array as shown in FIG. 13a. As noted above, motors M1–M3 contain X-direction and Y-direction coils, each of which subtends a longitudinal region (typically the region's width is about ¼ the spacing of like-oriented poles, S). When the coil is aligned with the center of a column of like-oriented poles, the average flux intercepted by the coil is at a maximum. However, the flux is averaged for all permanent magnets 301, 302 in a column so that the average peak flux intercepted by one motor coil is half the peak flux of permanent magnet 301, 302 alone.

According to one embodiment of the present invention, round magnets are used instead of square ones. The round magnets are arranged as shown in FIG. 13b so that their diameters can be as much as the length of the diagonals of the squares of the arrangement of FIG. 13a. If the circles are close-packed, as shown in FIG. 13b, the ratio of average peak flux to peak flux for magnet 301, 302 is increased, over the arrangement of FIG. 13a, from 0.5 to 0.707 for a hypothetical infinitely narrow coil or a single wire. The arrangement of FIG. 13b has the additional advantage of reduced cogging. Measured cogging for the round-magnet close-packed array shown in FIG. 13b, with S=1.2 inch is 0.9# versus 3# for the configuration of FIG. 13a.

According to another embodiment of the invention, a diamond array as shown in FIG. 13c is used. In this configuration, there is no space between any magnets so the packing density is 100%. The ratio of average peak flux to peak flux for magnet 301, 302 approaches 1.0 for a single wire, or a infinitely narrow coil (as opposed to a typical-size coil). For a coil of practical size, the ratio is actually between 0.6 and 0.7, depending on the coil width.

Note that the arrangement of the magnets in embodiments of FIGS. 13b and 13c are similar to the arrangement of FIG. 13a in that magnets with the same pole orientation form rows and columns that are aligned with the long axes of the X-axis and Y-axis coils of the X- and Y-motor armatures, respectively.

Note that the arrangements of FIGS. 13b and 13c are arranged such that it is possible to position a thin coil or single wire in a plane of the magnet array where said coil runs over several of the north-oriented magnets without touching any of south-oriented magnets, with less than 50% of the coil or wire running over an area not occupied by a magnet. This means the averaged peak flux density intercepted by the coil or wire is greater than 50%. The graphs adjacent the plan view of the motor platens of FIGS. 13a, 13b, and 13c, show the variation instantaneous average flux as the coil moves over the platen for a single wire 602 and for a coil of more realistic dimension of about S/4 601, where the spacing between like-oriented magnets is S. As can be seen from the figures, the peak flux for an S/4 wide coil and that for a single wire are the same, about 0.707. The former, however, falls off sooner than the latter as the real coil overlaps opposite poles for a greater proportion of the total displacement. In the diamond-shaped magnet array, the peak flux for a single wire is 100% but that for a realistic coil of S/4 width is about ⅔.

Figure 14A:
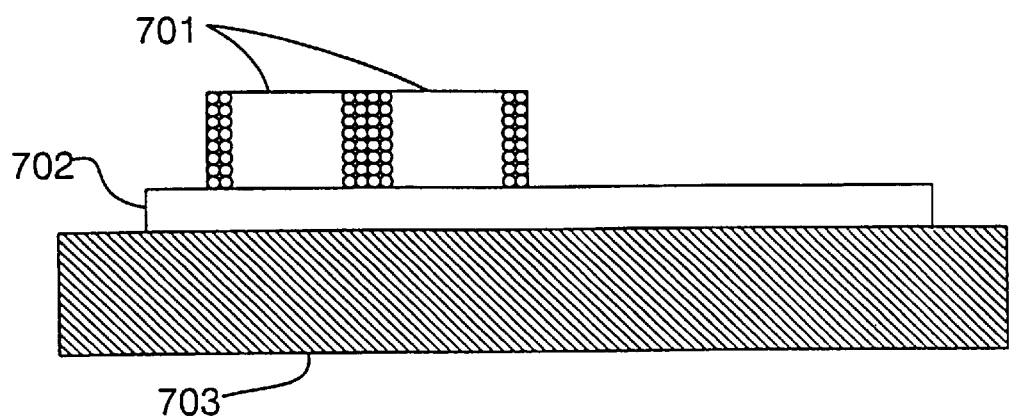
FIGS. 14a, 14b, and 14c are section views of various methods of forming arrays of permanent magnets for the base.
Figure 14B:
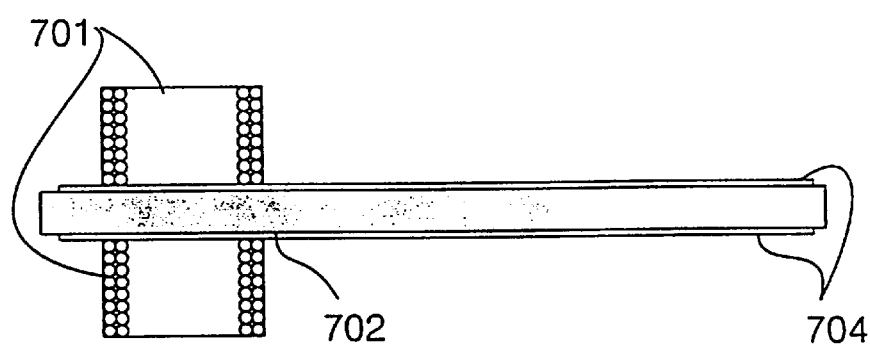
Figure 14C:
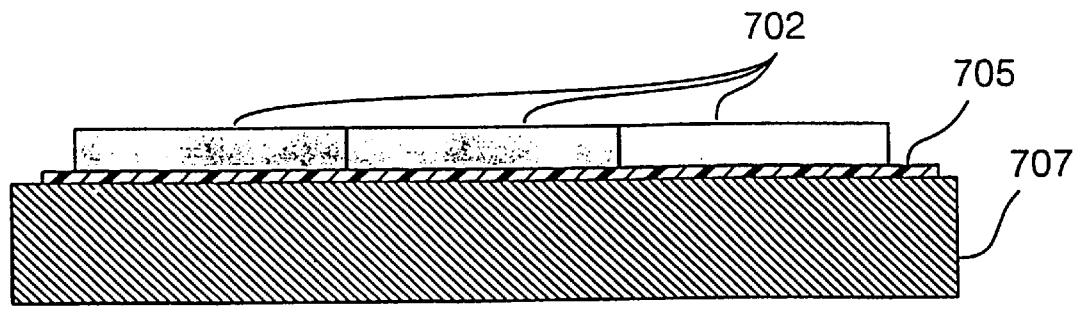

Referring to FIG. 14a, to form the magnet array, pieces (for example, sheets) of magnetizable material 702 may be arranged on a base 703 of material characterized by high flux saturation levels. A pair of coils 701 is then pressed against the magnetic material and a current passed through coils 701 to magnetize a region of magnetizable material 702, base 703 closing a magnetic circuit between two coils 701. Coils 701 can then be moved in successive steps over the entire surface of magnetizable material 702 until an array of magnetic regions is formed. Such a method is particularly applicable to form an array such as shown in FIG. 13b.

Instead of using a base 703 of high permeability material, alternatively, the magnetizable material can be lined with non-magnetic material 704 and directly pressed from either side by two coils 701 to magnetize magnetizable material 702. Magnetized material 702 is then placed on a cast iron plate or steel plate 707. Due to the high attraction forces, magnetic material 702 can be lowered by a suitable jack, wax 705 being used to support magnetized magnetic material 702 on the surface of plate 707. Once magnets 702 are in position, wax 705 can be melted away to achieve close contact between the magnets 702 and the base plate 707.

Note that although the diamond array of FIG. 13c could achieve similar results if the shapes of magnets 301, 302 were changed to a parallelogram shape because diagonals of such parallelogram-shaped magnets would still be perpendicular.

Note that although the embodiments described above relate to planar X-Y traversing systems, the invention applies equally to other types of traversing systems. For example, a traversing system in which a stage moves about a non-planar base could also employ the features described above for the base. Such devices are considered to be within the scope of at least some of the claims.

Note that claims may refer to independent movement in multiple axial directions using terms like orthogonal and perpendicular. It is clear that wherever in the specification movement along mutually perpendicular or orthogonal directions is discussed, such movement can be regarded as characterizing marginal degrees of freedom and therefore encompass any orthogonal coordinate system. For example, the X-direction could be regarded as an angle and the Y-direction as a displacement along the axis of a cylindrical coordinate system. Such variations within the scope of the invention and within the scope of at least some of the claims below. It is also noted here that such terms are not intended to be construed as narrowly as the mathematical sense of orthogonal coordinate systems. For example, a cylindrical coordinate system is not truly an orthogonal coordinate system. However, the present invention is applicable to a system that moves a stage over a cylindrical surface with projection of the X-Y grid on the cylindrical surface. Such a system is disclosed in Applicant's application filed prior to or concurrently with this application (The device is summarized in the next section summarily describing a rotary linear motor). Claims that speak of perpendicular or orthogonal movement are intended to cover movement such as that in such a cylindrical encoder system. In a cylindrical arrangement, magnets would be arranged in a translationally symmetric pattern, just as in the flat platen. The term "translationally symmetric" is used here to characterize any pattern that is achieved by making copies of the same thing at equal distances from each other. So, for example, a regular pattern of identical tiles forms a translationally symmetric array whether they are laid on a flat surface or a cylindrical surface.

Summary Description of a Rotary-Linear Motor

Briefly, a motor, with two independent degrees of freedom, rotates a stage about an axis and moves the stage along the axis, the range of motion defining a cylinder or cylindrical section. The stage is mounted on a hollow cylindrical plunger fitting in an annular well. The plunger floats on an air-bearing. The plunger has an array of permanent magnets on its external cylindrical face opposite coils in the well. Equal numbers of oppositely-polarized permanent magnets are arranged in a regular cylindrical pattern at 50% packing density forming rings and columns of like-polarity magnets, the rings of one polarity alternating with rings of opposite polarity and the columns of one polarity alternating with columns of opposite polarity. A set of Z-axis coils (for axial movement) curve (the term "curve" being used in its general mathematical sense to encompass straight lines as well is non-straight lines) around the plunger and are shaped to allow a current in them to impel the rings of like-polarized magnets. A set of φ-axis coils (for rotational movement) have longitudinal axes that are parallel the axis of the plunger and are sized to allow current in them to impel the columns of like-polarized magnets. Air is injected into a space between a center column defining the center of the annular well and the internal surface of the plunger to support the plunger. Part of the external surface of the plunger has a grid scale encoded by Z-axis and φ-axis optical pickups to provide position information to a controller.

According to an embodiment of the present invention, there is provided, a rotary-linear motor, comprising: first and second elements, each having a common axis, the first element having at least one magnet, the second element having at least first and second electrical coils capable of generating respective first and second magnetic fields, a bearing to support the first element with respect to the second element to allow the first and second elements to rotate about an axis relative to each other and to slide in a direction collinear with the axis, the first and second coils being positioned relative to each other and relative to the magnet such as to produce a substantial motive force capable of both rotating and displacing the first and second elements with respect to each other when the first and second coils are excited by an electrical current.

According to another embodiment of the present invention, there is provided, a rotary-linear motor, comprising: a base element having one of a plurality of magnets and a plurality of coils, a stage element having the other of a plurality of magnets and a plurality of coils, the stage element being connected to the base element such that the stage element is free to rotate on an axis and slide along the axis, the plurality of magnets and the plurality of coils being arranged to generate a motive force therebetween when the plurality of coils is energized.

According to still another embodiment of the present invention, there is provided, a rotary-linear motor, comprising: a base member, a stage member, the base member having a first cylindrical surface, the stage member having a second cylindrical surface, the first and second cylindrical surfaces having a common axis, the base having one of a plurality of magnets and a plurality of electric coils shaped in such a way as to define a first cylinder coaxial with the common axis and the stage having another of the plurality of magnets and the plurality of electric coils shaped in such a way as to define a second cylinder coaxial with the common axis.

The above rotary-linear motor can employ a multi-axis encoder system, such as described in the present application. The grid scale would be projected on a cylindrical surface and the X- and Y-optical pickups would resolve axial and tangential portions of the curved grid scale.

Although only a few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

What is claimed is:

1. A method of making an array of magnets, comprising the steps of:
   placing a generally planar piece of magnetizable material on a piece of material with a magnetic permeability comparable to or greater than that of iron;
   placing, against a face of said piece of magnetizable material opposite said piece of high magnetic permeability material, a pair of coils;
   generating currents in said pair of coils, a direction of current in one of said pair of coils being opposite that of a direction of current in the other of said pair of coils;
   holding said pair of coils against said face of said piece of magnetizable material for a sufficient period of time to form a magnetized region; and
   moving said pair of coils to a plurality of locations on said piece of magnetizable material and repeating said step of generating and said step of holding for each of the plurality of locations to form a translationally symmetric pattern of magnetized regions.

2. A method as in claim 1, wherein said pair of coils are a pair of round coils.

3. A method as in claim 2, further comprising the steps of:
   moving said pair of coils to another location on said piece of magnetizable material; and
   repeating said step of generating and said step of holding.

4. A method as in claim 3, further comprising the step of determining a new position to which to move said pair of coils such that a pattern of round regions will be formed by said steps of generating and holding in which more than 50% of said piece of magnetizable material will be magnetized.

5. A method as in claim 4, wherein said step of determining includes insuring said position is such that magnetic regions oriented with their poles in the same direction, formed by said steps of generating and holding, will be aligned in rows and columns parallel long axes of coils of a stage that moves over said array of magnets.

6. A method as in claim 1, further comprising the step of determining a new position to which to move said pair of coils such that a pattern of round regions will be formed by said steps of generating and holding in which more than 50% of said piece of magnetizable material will be magnetized.

7. A method as in claim 6, wherein said step of determining includes insuring said position is such that magnetic regions oriented with their poles in the same direction, formed by said steps of generating and holding, will be aligned in rows and columns parallel long axes of coils of a stage that moves over said array of magnets.

8. A method of making an array of magnets, comprising the steps of:
   placing, against opposite faces of a generally planar piece of magnetizable material, a pair of coils;
   insulating said coils from contact with said piece of magnetizable material prior to said step of placing;
   generating currents in said pair of coils, a direction of current in one of said pair of coils being the same as that of a direction of current in the other of said pair of coils;
   holding said pair of coils against said piece of magnetizable material for a sufficient period of time to form a magnetized region; and
   moving said pair of coils to a plurality of locations on said piece of magnetizable material and repeating said step of generating and said step of holding for each of the plurality of locations to form a translationally symmetric pattern of magnetized regions.

9. A method as in claim 8, further comprising the step of determining a new position to which to move said pair of coils such that a pattern of round regions will be formed by said steps of generating and holding in which more than 50% of said piece of magnetizable material will be magnetized.

10. A method as in claim 9, wherein said step of determining includes insuring said position is such that magnetic regions oriented with their poles in the same direction, formed by said steps of generating and holding, will be aligned in rows and columns parallel long axes of coils of a stage that moves over said array of magnets.

* * * * *